Feb. 20, 1968 M. GREEN 3,370,293
DIRECTION FINDER
Filed Feb. 2, 1966 4 Sheets-Sheet 1

INVENTOR.
MILTON GREEN
BY Arthur L Bowers
   AGENT
   John M Pease
   ATTORNEY

INVENTOR.
MILTON GREEN
BY Arthur L. Bowers
AGENT
John M. Pierce
ATTORNEY

Feb. 20, 1968    M. GREEN    3,370,293
DIRECTION FINDER
Filed Feb. 2, 1966    4 Sheets-Sheet 3

INVENTOR.
MILTON GREEN
BY
AGENT
ATTORNEY

United States Patent Office 3,370,293
Patented Feb. 20, 1968

3,370,293
DIRECTION FINDER
Milton Green, 926 Buddington Road,
Groton, Conn. 06340
Filed Feb. 2, 1966, Ser. No. 524,980
5 Claims. (Cl. 343—119)

ABSTRACT OF THE DISCLOSURE

Four circularly arranged sensors responsive to a particular kind of energy and a cylinder are supported coaxially. With respect to energy incident to the sensors from a direction at an angle to the axis, at least one of the sensors is in the shadow of the cylinder and reflective surface area of the cylinder redirects incident energy to the opposite sensor. The intensities of irradiation of opposite sensors are compared and servomechanisms operate to change the orientation of the axis defined by sensors and cylinder to minimize the difference in intensities of irradiation of the sensors.

The invention described herein may be manufactured and used by or for the Government of the United States of America for governmental purposes without the payment of any royalties thereon or therefor.

This invention relates to a direction finder and more particularly to means for locating or indicating the direction of a source of electromagnetic, acoustic, and corpuscular energy.

Techniques and apparatus for improving upon detection under conditions of poor visibility of the direction of a signal emitting source or more broadly an energy emitting source is a continuing requirement in military science and in navigation. Devices enabling location of real or apparent energy radiating sources are generally referred to as direction finders.

An object of this invention is to provide a simpler to fabricate, more versatile, more sensitive and accurate and generally superior means useful for direction finding, or for tracking a vehicle or object carrying a specific energy source, or for maintaining proper orientation of a solar battery panel relative to the sun, or for maintaining orientation of any selected apparatus relative to a predetermined source of energy emanation.

Other objects and advantages will appear from the following description of an example of the invention, and the novel feature will be particularly pointed out in the appended claims.

This invention utilizes well known detectors and reflectors of the kind of energy of interest. For example, for detection of energy in the visible spectrum, photodetectors such as the photovoltaic solar cell, the phototransistor, the photoconductive cell or the photomissive cell may be used. For acoustical detection the detectors are acousto-electric transducers. An embodiment of this invention for response to a preselected type of energy calls for a detector to which that energy responds.

Figure 1:
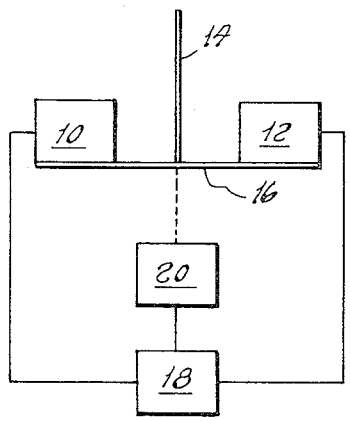
Figure 2:
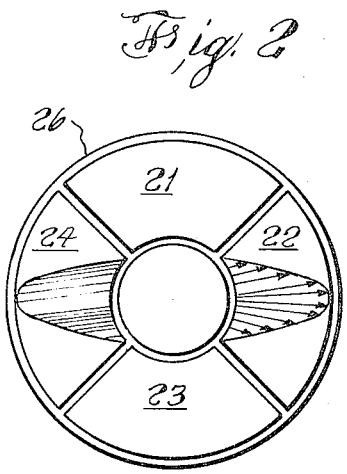
Figure 3:
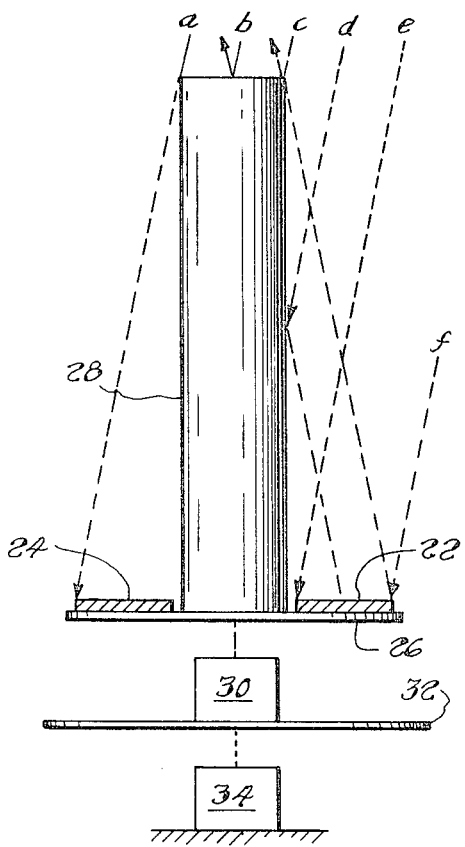
Figure 4:
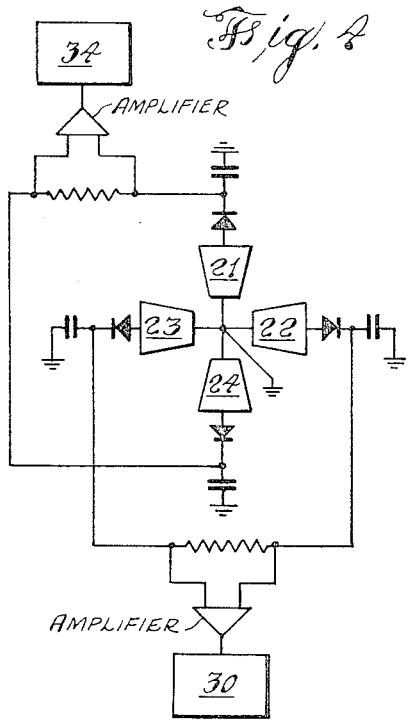
Figure 5:
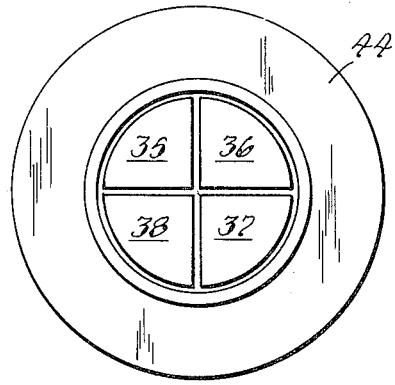
Figure 6:
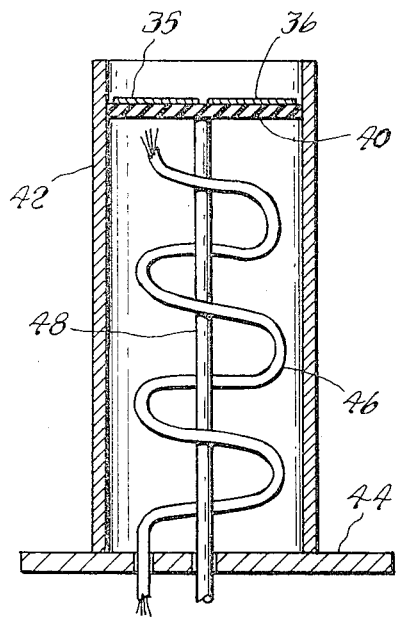
Figure 6A:
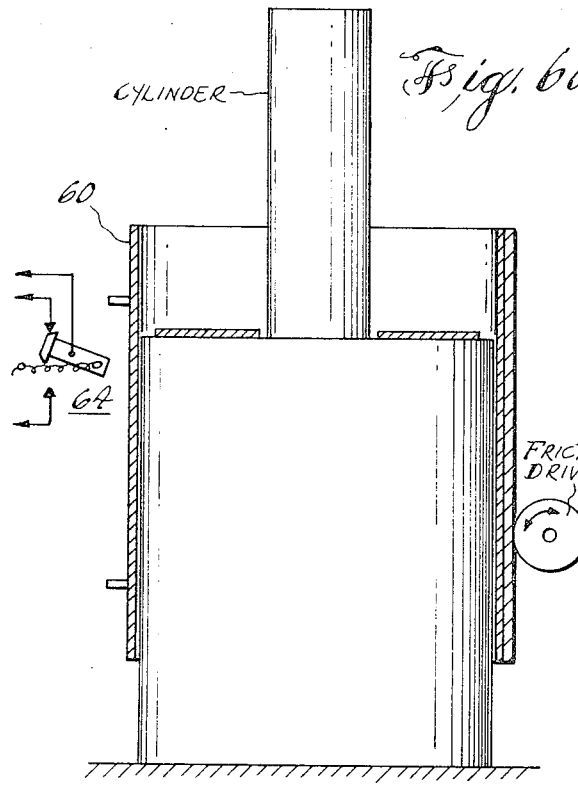

FIG. 1 is a block diagram illustrating the principles of this invention,

FIG. 2 is a top plan view and FIG. 3 is a side elevation view partly in section of an embodiment of this invention including a showing of illumination by a source not shown, at an angle thereto, FIG. 4 is a simplified circuit diagram of the embodiment shown in FIGS. 2 and 3, FIG. 5 is a top plan view and FIG. 6 is a side elevation view partly in section of another embodiment of the invention, FIG. 6A is analogous to FIG. 6 showing an adjustable shielding arrangement for the external detectors.

Figure 7:
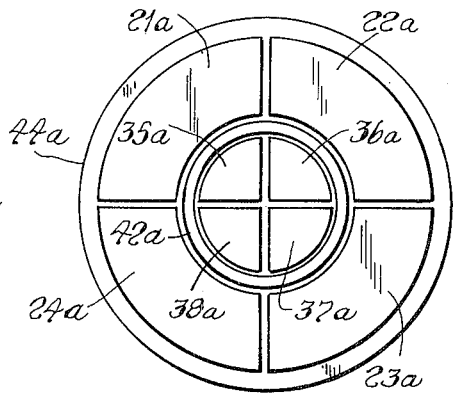
Figure 8:
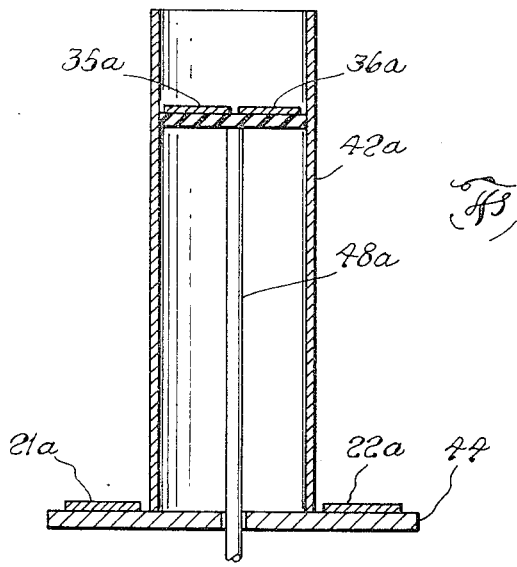
Figure 9:
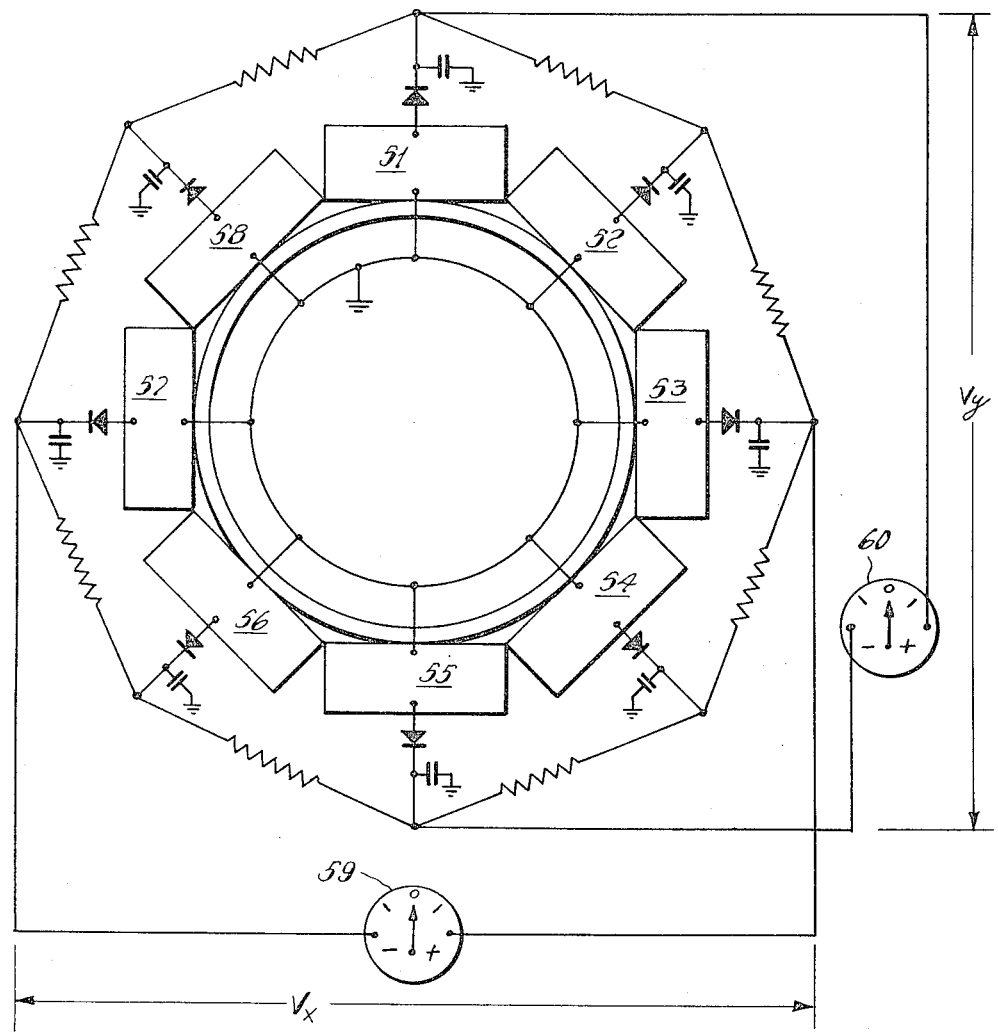

FIG. 7 is a top plan view and FIG. 8 is a side elevation view partly in section of an embodiment that combines features of the preceding embodiments, and FIG. 9 is a schematic of another embodiment employing more than four detectors.

This invention operates on a different principle from direction finders known in the art. It operates on reflection and casting a shadow.

In Fundamentals of Sonar by Dr. J. W. Horton published by U.S. Naval Institute, Annapolis, Md., there is discussed on pp. 269–286 amplitude difference and phase difference techniques employed in underwater acoustic bearing deviation indicators. This invention can utilize either technique. However, the embodiments disclosed herein are described in terms of amplitude or intensity difference.

The broader aspects of this invention concern a pair of identical detectors 10, 12 of the kind of energy that is of interest and a barrier 14 that reflects the energy efficiently, supported by a platform 16 intermediate the detectors and transverse to the plane of the paper as shown in FIG. 1. The detectors 10, 12 are shielded against any of the energy arriving rearwardly. The barrier has smooth surface area directed toward each detector. The detectors provide an electrical output which in a function of the intensity of the intercepted energy. The term intensity as used herein relates to the instantaneous total of the intercepted energy absorbed by the detector. If the incident energy arrives parallel to the barrier, both detectors are illuminated equally. If the incident energy arrives at an angle to the barrier, some of the incident energy is intercepted by the barrier and reflected, thereby increasing the intensity of energy incident to one of the detectors while reducing the intensity of energy incident to the other detector. The barrier thus establishes a substantial differential between the intensities of the energy absorbed by the two detectors. The differential is obtained by summing in opposition the electrical outputs of the detectors in circuit 18. The differential is coupled to a servomechanism 20 which is mechanically coupled to the platform 16 and angularly adjusts the platform about an axis normal to the pair of detectors to minimize the differential.

Diffraction effects are minimal where the dimensions of the detectors and reflector are large compared to a wavelength of the radiation to be detected. In the case of long wavelength radiation practical considerations may restrict detector and reflector size. Nevertheless, we have found experimentally with acoustical energy that the device still discriminates directionally even when the wavelength of the radiation is as much as three times the linear dimension (diameter) of the detector.

FIGS. 2 and 3 show an embodiment of the invention not limited to displacement about one axis. A planar annular array of four flat identical ninety degree sector detectors 21, 22, 23, and 24 of a type responsive to a frequency band in or adjacent the visible spectrum is secured to a platform 26. A circular cylinder 28 of a material that efficiently reflects the energy of interest and having a smooth outer surface is secured normal to and coaxial with the planar array. Each detector may be one element or an assemblage of smaller elements. The platform structure shields the detectors against radiation arriving rearwardly. A servomechanism 30 mounted on a platform 32 is coupled to the platform 26 for arcuately displacing the platform 26 about one axis normal to the cylinder 28. A fixedly mounted servomechanism 34 is coupled to the platform 32 for arcuately displacing the axis defined by servomechanism 30 about a second axis perpendicular thereto and to the cylinder 28. FIG. 4 illustrates a suitable circuit arrangement for connecting the detectors and the servomechanisms.

If energy arrives at the apparatus from the direction shown in FIG. 3 as indicated by rays *a* through *f*, rays *b*, *c*, *d* and intercepted by the cylinder and rays *e* and *f* are incident upon detector 22. Rays parallel to but outside of *a* and *f* are not intercepted. Rays between *a* and *c* are deflected by the top of the cylinder whereby a shadow is cast on detector 24 to the left of the cylinder as shown in FIG. 2. Rays between *c* and *e* are reflected by the cylinder to the detector 22. Rays between *e* and *f* also reach detector 24 so that in this area the reflected rays and the direct rays are superimposed. If the incoming radiation is incoherent, the intensities of the reflected and direct radiation is additive and in these areas, the energy intercepted by the detector 22 is enhanced. This is indicated by the region with the arrows in FIG. 2. If the incoming radiation is coherent then the superimposed rays interfere. In a region of interference there are alternate light and dark fringes. However, the net effect integrated over the superimposed area is an enhancement equivalent to or greater than for incoherent radiation.

The effect of enhancement of the radiation on one side of the cylinder by reflection and the shadow on the other side produces differential electric voltages between the opposite detectors. These differential or error voltages are amplified and fed to servomotors as shown in FIG. 4 which line up the cylinder axis with the source of the radiation, irrespective of the direction of the source of radiation. The rectifying diodes are required if the incoming radiation produces an A.C. signal, otherwise they may be omitted. The magnitudes of resistances and capacitances determine the time constant.

Band discrimination means of the bandwidth appropriate to the circumstances are included in the system to discriminate against unwanted signals or background.

In the embodiment shown in FIGS. 5 and 6 the detectors 35, 36, 37, 38 in the configuration of quadrants of a circle are mounted on a longitudinally adjustable platform 40 of insulating material within a metal cylinder 42 having a very reflective inner surface secured on a base 44. A cable 46 including the connections for the detectors extends through the base 44 and is coiled loosely around the column 48 that adjustably positions the platform 40. A servomechanism and circuit arrangement as in FIGS. 3 and 4 is used for this embodiment. By increasing the depth of the platform 40 within the cylinder, the solid angle to which it responds is reduced. If the direction finder responds to multiple targets at balance, the direction finder points toward the mean of the targets in terms of intensities. To cause it to point toward the most intense target, the platform is gradually cranked inward from its outer position, whereby the radiation from the weaker sources at the greatest angles of incidence will be the first to be obstructed by the cylinder.

As each weaker source is shielded out by progressive recessing of the detector platform, the direction finder adjusts its orientation toward the most intense source. If the targets are sufficiently separated in angle, the direction finder will point toward the strongest target when the detectors are recessed sufficiently inward of the open end of the cylinder. FIG. 6A shows a cylinder 60 longitudinally adjustable by a reversible friction drive 62 and limit switch means 64 for controlling the friction drive. This embodiment is operable in the same manner as the embodiment in FIG. 6.

The embodiment illustrated in FIGS. 7 and 8 combine the detector arrangements of the other two embodiments. The external detectors respond to radiation from a solid angle of 180 degrees whereas the internal detectors respond to an adjustably limited solid angle. They can be used to control the servomechanism circuitry in succession for coarse and fine direction finding or they can be operated in series or they can be used separately, the external detectors controlling the servomechanism and the internal detectors being coupled to instrumentation for providing information on the presence of closely spaced energy sources.

By having the cylinder of the direction finder of FIGS. 2 and 3 or FIGS. 5 and 6 point in the vertical direction and by connecting amplified signals from opposed pairs of detectors two mutually perpendicular sets of Helmholz coils that are oriented with their axes parallel to diametral lines through the centers of the detectors, and by placing a magnetic compass at the center of the two sets of coils, the compass needle will be urged to line up with the azimuthal direction of the radiation. A similar arrangement with the cylinder of the direction finder oriented horizontally, e.g., south-north, enables measurement of the angle of elevation of a source in one hemisphere. A similar arrangement with the cylinder in-line back-to-back with the other enables measurement of the angle of elevation of a source in the other hemisphere.

Another embodiment shown in FIG. 9 employs eight rectangular detectors 51 through 58 inclusive arranged in the shape of a regular octagon. Electrical connections are as shown. The signal voltages $V_x$ and $V_y$ may be used to control servomechanisms as described previously, or may be coupled to meters 59 and 60 as in FIG. 9. If the centers of detectors 51 and 55 are oriented north-south, the ratio of the voltages $V_y/V_x$ is equal to the tangent of the azimuth angle.

In certain situations it may be desirable to use a cylinder with rectangular cross-section to cast the shadow instead of one with a circular cross-section. In this case a suitable geometric shape for the sensors is a square, one for each quadrant of the internal cross-section of the square hollow-cylinder. We have tested such an experimental arrangement acoustically with very good results.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:
1. A direction finder for an emitter of a preselected kind of energy comprising:

a circular cylinder open at least at one end and that is a good reflector of said energy incident to its internal surface, and a planar circular array of four identical quadrant shaped sensors of said energy supported within said cylinder coaxially therewith and directed toward said open end of said cylinder.

2. A direction finder as defined in claim 1 further including:

means for adjustably positioning said array longitudinally in said cylinder.

3. A direction finder for an emitter of a preselected kind of energy comprising:

a circular cylinder that is a good reflector of said energy incident to its external surface, and a planar annular array of four identical ninety degree sector shaped sensors of said energy supported around said cylinder coaxially therewith.

4. A direction finder for an emitter of a preselected kind of energy comprising:

a circular cylinder open at least at one end and that is a good reflector of said energy incident to its external and internal surfaces, a planar circular array of four identical quadrant shaped sensors of said energy supported within said cylinder coaxially therewith and directed toward said open end of said cylinder, means for adjustably positioning said array longitudinally in said cylinder, and a planar annular array of four identical ninety degree sector shaped sensors of said energy supported adjacent the other end of said cylinder around said cylinder coaxially therewith and directed toward the open end of said cylinder.

5. A direction finder for an emitter of a preselected kind of energy comprising:
- an essentially circular array of an even number of equiangularly spaced sensors responsive to said preselected kind of energy to provide an electrical output which is a function of the intensity of the incident energy, and
- an element having a cylindrical surface concentric with said sensors and directed toward said sensors which surface is reflective to said kind of energy,
- whereby the direction of the emitter is ascertainable by comparison of the electrical outputs of opposite ones of the sensors.

References Cited
UNITED STATES PATENTS

| | | | |
|---|---|---|---|
| 2,334,085 | 11/1943 | Graves et al. | 343—113 X |
| 2,492,148 | 12/1949 | Herbold | 250—203 X |
| 3,260,849 | 7/1966 | Polye | 250—203 |
| 3,268,185 | 8/1966 | Eckermann | 250—203 X |

RODNEY D. BENNETT, *Primary Examiner.*

R. E. BERGER, *Assistant Examiner.*